Jan. 9, 1945.   R. O. WALKER   2,366,761
SCREEN FOR THE RECEPTION OF PROJECTED IMAGES
Filed Jan. 24, 1941
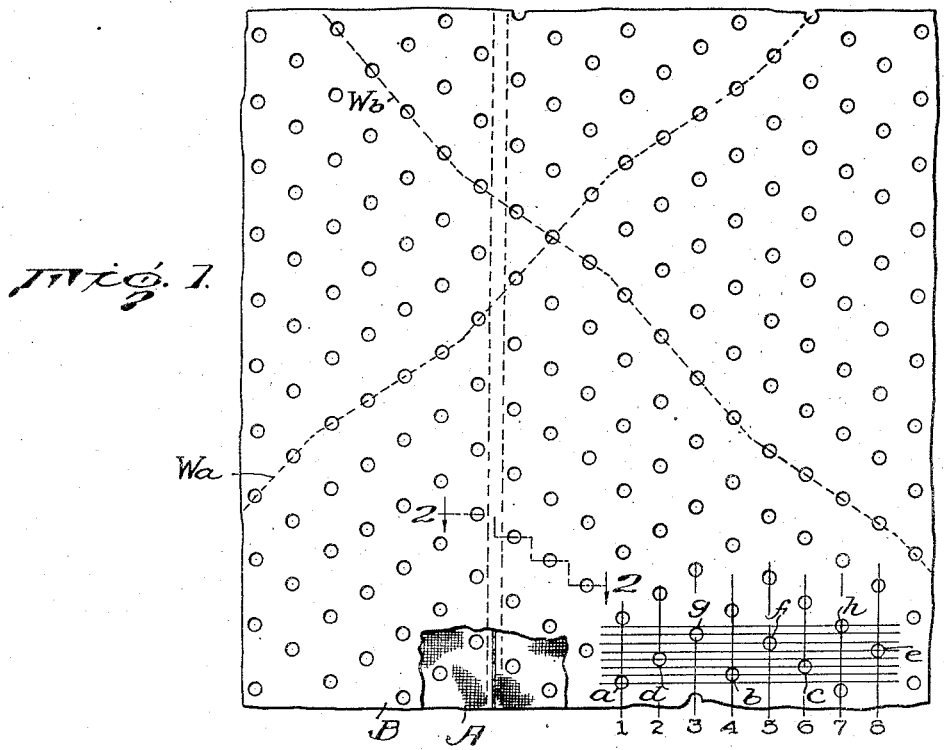
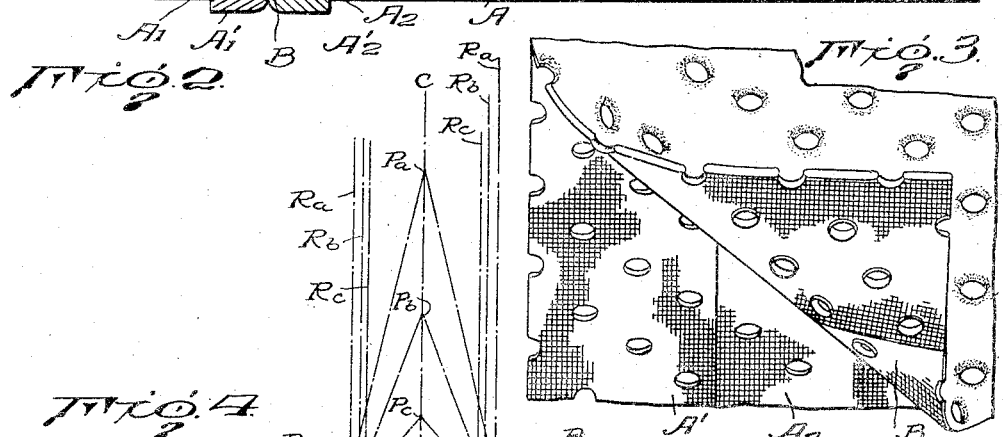
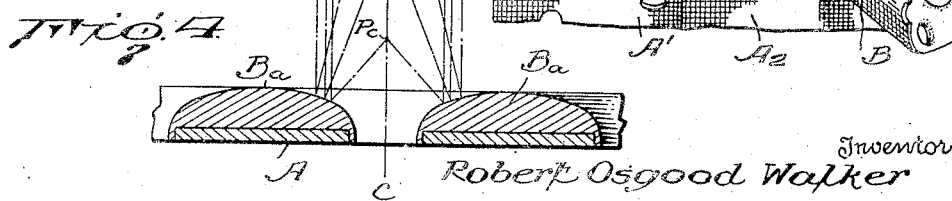
Inventor
Robert Osgood Walker
By Emery, Varney, Whittemore & Dix
Attorneys Patented Jan. 9, 1945

2,366,761

UNITED STATES PATENT OFFICE 2,366,761

SCREEN FOR THE RECEPTION OF PROJECTED IMAGES

Robert Osgood Walker, New York, N. Y.

Application January 24, 1941, Serial No. 375,854

5 Claims. (Cl. 88—28.92)

This invention relates to an improved product for reflecting light and shadows in a more efficient manner whereby the reflection is more diffuse and the amount of light reflected at large angles from the axis of the source of light is greatly increased.

One of the more highly technical uses of this improved product is when it is constructed as a motion picture screen for use in theatres and elsewhere. One of the great advantages of this improved product as a motion picture screen is that the persons sitting in the side seats of the theatre see the picture with substantially full light and with reduced lengthening or foreshortening.

One of the features of the invention is an improved light-reflecting screen for use in a picture projecting system which exhibits a marked illusion of depth or perspective in the reflected image or picture.

A further feature of the light-reflecting screen of the present invention is that the apparent distortion of the reflected image at wide angles of observation is materially reduced.

Other features, objects and advantages will become clearly apparent during the review of the more detailed description to follow.

The invention is illustrated in the accompanying drawing in which

Figure 1 is an enlarged face view of a fragmentary portion of the improved screen showing a portion of the reflecting surface broken away to illustrate a seam construction in the backing or supporting sheet;

Figure 2 is a sectional view of Figure 1 taken along the line 2—2 but shown on a greatly enlarged scale;

Figure 3 is a face view of a fragmentary part of the screen showing a portion of the reflecting coating peeled away from the backing sheet; and Figure 4 is a sectional view of an elementary part of the screen taken through the center of one of the apertures in the screen; and There is shown in Figures 1 and 2 one possible construction of the improved motion picture screen, but it will be understood that the invention may be embodied in other constructions than the one shown in the drawing. Figure 1 is a front view of a fragmentary part of the screen representing a square area measuring about two inches on one side. The screen is provided with a perforated backing sheet or support represented at A, which may be formed of any suitable material such as cotton drill but other flexible materials may be used if desired. The backing sheet is covered on its front face with a coating of plastic material represented at B.

In the case of large motion picture screens it is not always convenient to form the backing sheet of one piece, and the sheet may be formed of two or more pieces joined together as described hereinafter. A suitable material for the backing sheet is cotton drill, weighing 0.529 pounds per square yard and 59 inches wide. In building up the backing sheet a number of strips of cloth of an aggregate width sufficient to make up the desired width of screen are first impregnated with a solution (such as 95% water and 5% starch) to bond the fibers together and produce clean-cut apertures when the strips are later perforated. The strips are next coated on the back with a thin coat of plastic compound preferably containing a pigment and a plasticizer, this coating being applied by means of a standard artificial leather coating machine and being driven into the cloth by a very sharp coating knife so that the back of the cloth is left roughened to break up unwanted reflections of sound originating from the rear of the screen. The stiffened strips of cloth are next perforated in a standard crank-press perforating machine so that the strips are perforated with any suitable series of holes, preferably distributed in accordance with the design or pattern shown in Figure 1. As will been seen, the holes are arranged in two sets of waves or undulations running diagonally from left to right and from right to left. In Figure 1 dashed line Wa indicates one wave in one set of diagonal waves while line Wb indicates a wave in the other set of diagonal waves. This arrangement results in a chevron pattern produced by the two sets of waves. It will be observed that the perforations are arranged in vertical rows with equal horizontal spacing between rows and with equal vertical spacing between the holes in the different rows, but adjacent vertical rows are staggered in vertical position with respect to each other to produce the particular pattern shown. The purpose of arranging the holes in accordance with this pattern, is to reduce the reticulation of the image which would otherwise be observed if the holes were arranged to lie in straight lines horizontally as well as straight lines vertically and diagonally, or in accordance with any other simple geometrical arrangement. It will be observed that when the pattern is viewed in a direction normal to the plane of the drawing, the eye is not conscious of the fact that the holes are arranged in straight vertical lines, or in any definite pattern, but the holes appear to be uniformly distributed throughout the area.

The particular arrangement or pattern for the perforations as shown in Figure 1 is simply for the purpose of illustration, and it will be understood that there are many other possible arrangements which will secure the desired result. The particular pattern shown is developed from a unit design consisting of eight perforations spaced within a unit area covered by eight parallel horizontal lines shown in the lower right hand corner of Figure 1. As will be seen, the unit area of the design is ruled by equally spaced vertical lines numbered 1 to 8 inclusive in addition to eight horizontal lines. The eight perforations included within the unit area of the design are located at certain points of intersection of the two sets of lines, and by referring to Figure 1 it will be seen that the perforations a, b, c, d, e, f, g and h positioned on successive horizontal lines from bottom to top of the area are arranged at the intersecetions of the horizontal lines and vertical lines 1, 3, 7, 5, 2, 8, 4 and 6 respectively. The unit design just described is repeated throughout the area of the backing sheet, and it is clear the perforating punch and die need be only as large as the unit area.

The perforations should be of such size and density that when the screen is viewed from a point in front of its center, at a distance about equal to the width of the screen, the apertures will not be visible. For moving picture theatre screens it is found that satisfactory results are obtained when the perforations have a diameter of about 3/64ths of an inch and a density of about 28 perforations per square inch of screen area.

After the stiffened strips of backing cloth have been perforated the strips are joined together along their vertical edges in the following manner:

Two adjacent strips are superimposed with their faces in contact with each other and their edges matched. A seam is then sewed along one edge of the matched strips so that the seam is parallel to the outer row of holes and is spaced from the outer row a distance equal to one-half the distance of separation between adjacent vertical rows of holes. After sewing, the two strips are separated and flattened out into a common plane and the pattern or arrangement of the holes will continue unbroken from one strip to the adjacent strip. Upon flattening out the seam then two seam flaps are turned back and creased against the respective strips as shown in Figure 2 where A1 represents one strip; A2 represents an adjacent strip sewed to strip A1 by the stitches B, and the seam flaps A'1 and A'2 lie flat against their respective strips.

After the strips have been assembled to form the backing sheet, the sheet may next be provided with a reinforcing border preferably consisting of a strip of artificial leather approximately five inches wide which is doubled over around the outer edge of the backing sheet and cemented to the face and back of the edge portions of the sheet. Suitable grommets are provided at spaced points around the outer edge of the border for lacing the backing sheet in a suitable framework to hold the backing sheet in a flat position during subsequent operations.

For the purpose of applying a suitable coating B to the face of the mounted backing sheet, the supporting frame is usually placed in horizontal position with the front surface of the sheet on top. The upper surface of the backing sheet is then coated uniformly with plastic material in any suitable condition but preferably in liquid form which upon drying forms a relatively hard, smooth surface on the front of the screen. I prefer to apply the plastic material to the sheet by spraying the material on the sheet in a finely divided spray. For the purpose of securing a uniform coating, the spray gun is mounted upon the movable carriage of a gantry arranged to span and traverse the backing sheet on tracks which run parallel to one dimension of the backing sheet, and the gantry and the movable carriage are operated so as to cause the spray gun to traverse the surface of the backing sheet in parallel runs, each run being displaced from the other by a predetermined distance at right angles to the direction of the run until the entire surface of the sheet is covered in a uniform manner. This method of spraying the surface of the sheet is substantially like the operation of an electron gun in scanning an image in a television system. In practice, it has been found that the scanning lines for forming the base coatings may be separated a distance of the order of two inches and the finishing coat may be applied in scanning lines having a distance of separation of the order of one inch. The gantry is driven at a constant speed by any suitable source of power and is controlled by suitable apparatus well known to those skilled in the art.

The backing sheet is first coated with one or more layers of liquid coating compound, the layers being applied preferably in rapid succession as described above. Air pressures employed on the spray gun may vary from about fifty pounds to two hundred and fifty pounds and may be set as desired to have one substantially constant pressure during one application. The force of the spray will maintain the holes free of plastic material except for a ring of material which will adhere to the inner walls of the holes. A sufficient number of coats of plastic material are applied to the upper surface of the sheet to build up the coating to a thickness such that after drying the plastic coating will present a smooth surface which does not shown any of the surface irregularities of the backing sheet. Since adjacent runs of plastic material overlap each other, it is possible by controlling the separation of the runs to secure the desired thickness of coating with only one scanning operation.

Simply by way of illustration it has been found that in using a backing sheet formed of cotton drill having a thickness of approximately 0.010 inch, a satisfactory surface is provided where the coating is built up to a thickness of approximately 0.025 inch.

After the desired number of coatings or layers of plastic material are applied to the face of the backing sheet, the material is allowed to dry into a relatively hard, smooth flexible coating, and it will be found that the surface tension of the plastic material when in a liquid state will maintain the plastic material in a form which, upon drying, results in the formation of flaring apertures arranged centrally of the holes in the backing sheet and illustrated in Figure 2. From this figure, it will be seen that each hole is lined with a ring of plastic material extending to the back surface of the backing sheet, and the surface of the plastic material surrounding each hole is smoothly flared outwardly until the flaring surfaces merge into each other on the extreme front surface of the screen. As will be seen from Figure 2, the apertures in the plastic coating have generally the shape of a "morning glory" blossom, and the cross-section of the screen lying between adjacent holes or apertures is shaped generally in the form of a semi-ellipse having its major axis lying in the plane of the back surface of the backing sheet. These semi-elliptical areas are the cross-hatched area Ba shown in Figures 1 and 4.

The shape of the curved surfaces forming the flaring apertures is represented by a toric curve and the shape may be controlled to a certain extent by controlling the composition of the plastic compound applied to the sheet. The shape of the curve is controlled mainly by the surface tension of the plastic compound in a liquid state and by the air pressure blowing the plastic through the holes. The surface tension will be controlled by varying the relation between the solids content and the amount of solvents, plasticizers, pigments and other constituents. Also, the surface tension is influenced by the temperature, the air pressure, the pressure upon the liquid deposit, the nature of the solvents, and to some extent the nature of the pigment.

By selecting the proper pigment mixed with the liquid material forming the coating B, it is possible to use the coating as the light-reflecting surface for the screen, but the desired reflecting surface may be obtained by applying a further coating to the hard plastic coating to serve as a light-reflecting surface, especially where it is desired to provide a fluorescent surface on the front of the screen. A suitable fluorescent surface may be obtained by applying a thin coating of a transparent plastic into which a fluorescent salt has been dispersed by grinding or in any other manner. A suitable surface may also be obtained by applying a thin coating of liquid plastic over the front face of the screen and then insulphating or dusting the fluorescent salt or powder upon the surface while in a liquid state and permitting the fluorescent material to become imbedded in the plastic upon drying. The final finish coat need not have a thickness greater than one ten-thousandths of an inch and will not cause any appreciable variation in the curvatures of the apertures in the screen. The fluorescent coating may be selected to fluoresce instantly with quick extinction, or it may be selected for delayed fluorescence so that the image may continue visible for a part of the time when the shutter interrupts the projecting light beam. The fluorescent coating may also be selected to respond to ultra-violet rays as well as visible rays.

The fluorescent material may be added to the liquid plastic which is to form the coating B, thus avoiding the application of a further coating after the plastic coating has been formed, but, from considerations of cost and ease of production it is preferred to apply the fluorescent material as a final coating as described above.

Figure 3 shows a part of the screen with one corner of the plastic coating B peeled away from the backing sheet A and exposing a seam between adjacent strips of the backing sheet. This figure is made from a photograph of an actual structure and is intended to illustrate the monolithic or integral character of the plastic coating and the manner in which it completely masks out all surface irregularities and seams of the backing sheet. The rings of plastic material which line the walls of the apertures in the backing sheet are shown on the back side of the coating B.

In using the improved screen as a reflecting surface in a picture projecting system, the screen is freely supported in a suitable frame in a generally vertical position, and the picture image is projected on the face of the screen in the usual manner.

The light rays which fall upon the substantially flat portions of the screen lying in the regions about midway between the various apertures are reflected from the screen and produce an image of the picture practically in the plane of the front face of the screen in the usual manner. Other light rays, which fall on the curved surfaces of the flaring apertures or depressions, are reflected from the screen at varying angles depending upon the angle of the surface at the point of impact of each light ray, and the resulting effect of all of the reflections from the entire area of the screen appears to produce a marked illusion of depth in the observed image.

This illusion is clearly apparent in the actual use of the screen, and while the action of the light rays in producing the effect is probably not a simple matter, it is believed the following explanation will at least in part explain this effect:

While the light rays in the beam of a picture projector are not parallel to each other, but diverge from the axis of the beam by different angles in different parts of the beam, the following explanation of the action of the screen is based on the assumption that the projected rays are all parallel to the axes of the apertures which are parallel to each other. Certain of the rays falling on the aperture surface, and especially the rays which fall upon the outer flaring portion of the aperture surface, are reflected back in front of the screen and are focused along the axis of the aperture at varying distances from the front surface of the screen. This is clearly illustrated in Figure 4 where one flaring aperture is shown having an axis represented by the line C—C. A substantial portion of the projected light rays which fall upon the aperture surface at points equidistant from the axis C—C, such as the rays $R_a$, $R_a$ in Figure 4, are reflected back and are concentrated or focused at the point $P_a$ on the axis C—C. In a like manner, a substantial portion of the rays which fall upon points at an equal distance from the axis but nearer to the axis as in the case of the rays $R_b$, $R_b$ are reflected and are focused at the point $P_b$ on the axis C—C. Rays falling still nearer the center of the aperture such as the rays $R_c$, $R_c$ are focused at the point $P_c$ in front of the screen and on the axis C—C.

It will thus be seen that a substantial portion of the rays which fall upon the curved surface of each aperture are reflected back and focused at points on the axis of the aperture at varying distances in front of the screen. As explained above, the foregoing explanation is on the assumption that the projected rays $R_a$, $R_b$, $R_c$ are parallel with the axis of the aperture C—C, and strike the screen at right angles to the plane of the screen as shown in Fig. 4. Under this condition, the line of greatest concentration of the reflected rays, that is, the line including points $P_a$, $P_b$, $P_c$ is coincident with the aperture axis. In practice the projected rays striking different sections of the screen, especially at the outer portions, will not be parallel to the axes of the apertures, due either to the screen being tilted somewhat from a position normal to the axis of the beam or to the divergence of the rays in the beam, and the focusing action will be somewhat different, but the same general action takes place. Since each aperture is symmetrical about its axis, certain of the rays reflected from the flaring surface surrounding each aperture will be reflected and will intersect the axis of the aperture at points lying in front of the screen. It will also be understood that since the surface of the screen preferably will not be of mirror-like smoothness, there will be a certain amount of diffusion of the reflected light which may be varied from the diffuse to the specular by different surface treatments known to those skilled in the art. For each pencil of light rays striking an elementary area of the screen surface, a certain portion of the rays will be reflected along the major axis of reflection determined by the angle of incidence of the projected rays, while other rays will be reflected at varying angles from the major axis of reflection. When the projected light rays are normal to the screen, and the axes of the apertures are also normal to the screen, the major axes of reflection from points on the flaring surface of each aperture at different distances from the center of the aperture will focus substantially on the axis of the aperture at varying distances in front of the screen.

The cloth forming the backing sheet or support may be retained in a single strip through the impregnating and perforating treatment, and then cut into separate pieces and sewed together. A suitable sizing solution has already been given, and a suitable solution for impregnating the back of the sheet may be a standard artificial leather solution. This coating on the back is approximately 0.001 inch thick, and it also aids in bonding the fibers of the cloth together to produce clean-cut apertures in the cloth when perforated. If desired, one or more coats of the same artificial leather compound may be applied to the front face of the cloth before the cloth is passed through the perforating machine. One suitable composition for the plastic coating B may be: phthalic anhydride 20%; titanium dioxide (pigment) 20%; triphenyl phosphate 20%; and toluol (solvent) 40%. This mixture may be applied hot and maintained at a temperature of 140° F. during the coating process.

When the apertured screen is employed as a reflecting screen without accompanying sounds, the back of the screen may be covered by a covering of light-reflecting material so that the rays which would normally pass through the apertures are reflected back and aid in forming the observed image.

What I claim is:

1. A picture projecting screen comprising an extended area of light-reflecting material having flaring depressions distributed throughout the front face thereof, said depressions being symmetrically formed about axes at right angles to the face of said screen and having smooth outwardly flaring surfaces whereby when light rays fall upon the screen substantially parallel with the axis of each depression, the rays reflected from different points on the flaring surface of each depression are focused so that their major axes of reflection cross the axis of the depression at varying distances in front of said screen.

2. A light-reflecting screen comprising an extended area of light-reflecting material having uniformly shaped flaring apertures distributed thereover, said apertures having smooth outwardly flaring surfaces adjacent the front face of said screen whereby when light rays fall upon the screen substantially parallel to the axis of each aperture, the light rays reflected from different points on the flaring surface of each aperture are focused so that their major axes of reflection cross the axis of the aperture at varying distances in front of said screen.

3. A light-reflecting screen comprising a sheet of light-reflecting material having uniformly shaped apertures distributed over the area thereof, said apertures being formed with smooth light-reflecting surfaces of substantially "morning glory" shape having the smallest diameter thereof located substantially in the plane of the rear face of said sheet and having their flaring portions merging with the front face of said sheet, whereby the surfaces of said apertures function as optical elements for focusing images of elemental areas of said screen at points lying in front of said screen.

4. A screen for the reception of projected images comprising an extended area of light reflecting material having flaring apertures distributed therethrough, said apertures being symmetrically formed about axes parallel to each other and at an angle to the plane of the screen, said apertures further having smooth outwardly flaring surfaces whereby when light rays fall upon the screen substantially parallel to the axis of each aperture and strike the flaring surface of said aperture at points equidistant from said axis, said rays are so reflected that their major axes of reflection substantially focus on the said axis.

5. A screen for the reception of projected images comprising an extended area of light reflecting material having flaring apertures distributed therethrough, said apertures being symmetrically formed about axes parallel to each other and at an angle to the plane of the screen and having smooth outwardly flaring surfaces whereby when light rays fall upon the screen substantially parallel to the axis of each aperture and strike the flaring surface of said aperture, the major axes of reflection of the reflected rays are focused substantially along the said axis at a multiplicity of points at varying distances in front of said screen.

ROBERT OSGOOD WALKER.